United States Patent
Panday et al.

(10) Patent No.: US 9,016,582 B2
(45) Date of Patent: Apr. 28, 2015

(54) ELECTRO-OPTICAL CODE READING TERMINAL FOR SWITCHING FROM A PRINTED CODE READING MODE TO AN ELECTRONICALLY DISPLAYED CODE READING MODE

(71) Applicant: Motorola Solutions, Inc., Schaumburg, IL (US)

(72) Inventors: Konark Panday, New Delhi (IN); Jivitesh Chawla, Kotkapura (IN)

(73) Assignee: Motorola Solutions, Inc., Schaumburg, IL (US)

( * ) Notice: Subject to any disclaimer, the term of this patent is extended or adjusted under 35 U.S.C. 154(b) by 100 days.

(21) Appl. No.: 13/914,730

(22) Filed: Jun. 11, 2013

(65) Prior Publication Data
US 2014/0361085 A1 Dec. 11, 2014

(51) Int. Cl.
*G06K 7/10* (2006.01)
*G06K 7/14* (2006.01)

(52) U.S. Cl.
CPC ............ *G06K 7/146* (2013.01); *G06K 7/10732* (2013.01); *G06K 7/10752* (2013.01); *G06K 7/1095* (2013.01)

(58) Field of Classification Search
CPC . G06K 7/1095; G06K 7/146; G06K 7/10732; G06K 7/10752
USPC ............ 235/462.41, 383, 435, 439, 440, 449, 235/450, 454, 462.11, 375, 462.43
See application file for complete search history.

(56) References Cited

U.S. PATENT DOCUMENTS 6,749,120 B2   6/2004   Hung et al.
8,028,917 B2   10/2011  Giebel
(Continued)

FOREIGN PATENT DOCUMENTS

| | | |
|---|---|---|
| EP | 2482226 A2 | 8/2012 |
| GB | 2392286 A | 2/2004 |
| JP | 2002083263 A | 2/2002 |
| WO | 2012036882 A1 | 3/2012 |

OTHER PUBLICATIONS

M. Einat and A. Yahalom "Induced Static Magnetic Field by a Cellular Phone" Applied Physics Letters Aug. 31, 2011.
(Continued)

*Primary Examiner* — Kristy A Haupt
(74) *Attorney, Agent, or Firm* — Nick Fan (57) ABSTRACT

An electro-optical code reading terminal for dynamically switching mode of operation from a printed code reading mode to an electronically displayed code reading mode is provided. The electro-optical code reading terminal measures and monitors, using one or more magnetic sensors, a magnetic field experienced at the electro-optical code reading terminal. When the electro-optical code reading terminal device determines that a change in the measured magnetic field exceeds a predetermined threshold within a predetermined time period, the electro-optical code reading terminal device infers presence of an electronically displayed code. The electro-optical code reading terminal device then switches its mode of operation from the printed code reading mode of operation to the electronically displayed code reading mode of operation.

20 Claims, 6 Drawing Sheets

(56) References Cited

U.S. PATENT DOCUMENTS

| | | |
|---|---|---|
| 8,146,822 B2 | 4/2012 | Drzymala et al. |
| 8,777,109 B2 * | 7/2014 | Oberpriller et al. ..... 235/462.43 |
| 2002/0070278 A1 | 6/2002 | Hung et al. |
| 2012/0000982 A1 | 1/2012 | Gao et al. |
| 2012/0193429 A1 | 8/2012 | Van Volkinburg et al. |
| 2013/0062412 A1 * | 3/2013 | Tan et al. ............ 235/455 |

OTHER PUBLICATIONS

PCT International Search Report and Written Opinion mailed Oct. 8, 2014 counterpart to PCT/US2014/041072.

* cited by examiner

ELECTRO-OPTICAL CODE READING TERMINAL FOR SWITCHING FROM A PRINTED CODE READING MODE TO AN ELECTRONICALLY DISPLAYED CODE READING MODE

FIELD OF THE DISCLOSURE

The present invention relates generally to optical based registers, and particularly relates to an image sensor based code reading terminal that is capable of reading both printed codes and electronically displayed codes by image capture.

BACKGROUND

Solid-state code reading terminals are installed in many venues, such as supermarkets, warehouse clubs, airports, department stores, and other kinds of retailers to electro-optically read by image capture a plurality of decodable symbol codes, such as one-dimensional (1D) codes, particularly Universal Product Code (UPC) bar codes, two-dimensional (2D) bar codes such as Quick Response (QR) codes as well as non-symbol codes such as such as driver's licenses, receipts, signatures, etc. Typically, the symbol codes are printed with ink on media such as paper, metal, or plastic. Hence, these printed symbols are referred to as printed codes.

In recent years, it has become increasingly advantageous to display symbol codes on display screens of electronic devices, such as cellular mobiles phones, personal digital assistants (PDAs), e-readers, portable tablets, slates, and computers. Such symbol codes, displayed on display screens of electronic devices, are referred to as electronically displayed codes.

Known code reading terminals use different modes for imaging the printed codes and the electronically displayed codes. Unlike imaging of printed codes, imaging of electronically displayed codes is typically done without the use of illumination to avoid specular reflection from the display screens of electronic devices. One way of determining the correct mode of operation for imaging a symbol code is to provide a manual switch to allow an operator to select one of the two modes in accordance with an object presented before the code reading terminal. Another way is to take a first image of the object presented before the code reading terminal. If the image is successfully decoded, it is assumed that the object comprises a printed code. If the image is not successfully decoded, then it is assumed that the object comprises an electronically displayed code and a second image of the object is taken using illumination settings optimized for the imaging electronically displayed codes. However, such an hit-and-trial method degrades the battery life and eventually, the performance of code reading terminals.

Accordingly, there is a need to determine whether an object presented before the code reading terminal comprises a printed code or an electronically displayed prior to image capture and accordingly select mode of operation of the code reading terminal for image capture.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a method and apparatus for operating an electro-optical code reading terminal. The electro-optical code reading terminal measures and monitors, using one or more magnetic sensors, a magnetic field experienced at the electro-optical code reading terminal. When the electro-optical code reading terminal device determines that a change in the measured magnetic field exceeds a predetermined threshold within a predetermined time period, the electro-optical code reading terminal device infers presence of an electronically displayed code. The electro-optical code reading terminal device then switches its mode of operation from a printed code reading mode of operation to an electronically displayed code reading mode of operation.

By way of a non-limiting example, the electro-optical code reading terminal of the present disclosure is implemented at one or more of a flat-bed imaging terminal such as a vertical slot imaging terminal and a horizontal slot imaging terminal, a handheld barcode imaging device, a bi-optic point-of-sale imaging terminal, and any workstation comprising solid-state imagers capable of reading codes by image capture. Further, the electro-optical code reading terminal of the present disclosure is operative to read both the printed codes and the electronically displayed codes by image capture. As used herein, the term "code" refers to a plurality of decodable symbol codes, such as one-dimensional (1D) codes, particularly Universal Product Code (UPC) bar codes, two-dimensional (2D) bar codes such as Quick Response (QR) codes as well as non-symbol codes such as driver's licenses, receipts, signatures, etc.

Figure 1:
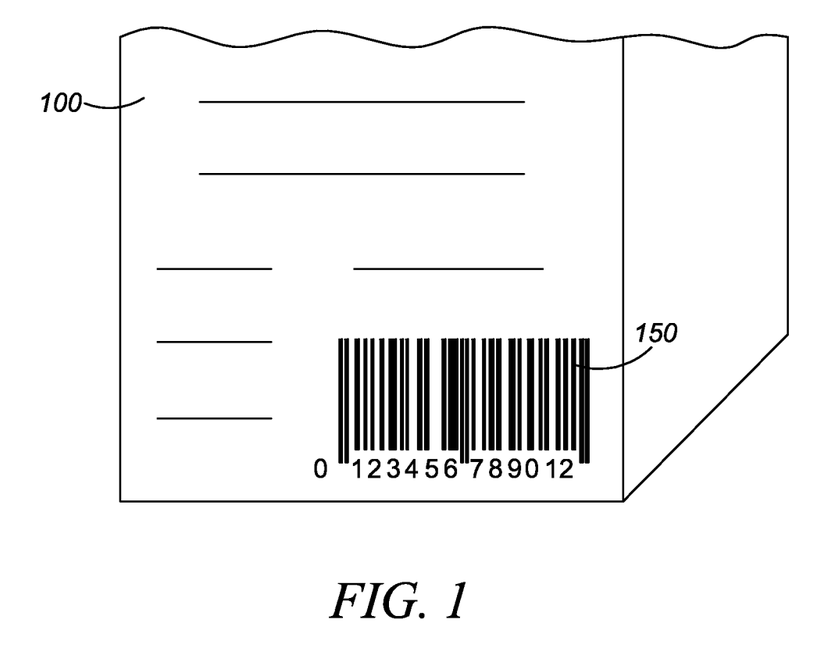
FIG. 1 illustrates an object comprising a printed code to be imaged by an electro-optical code reading terminal of FIG. 4.
Figure 4:
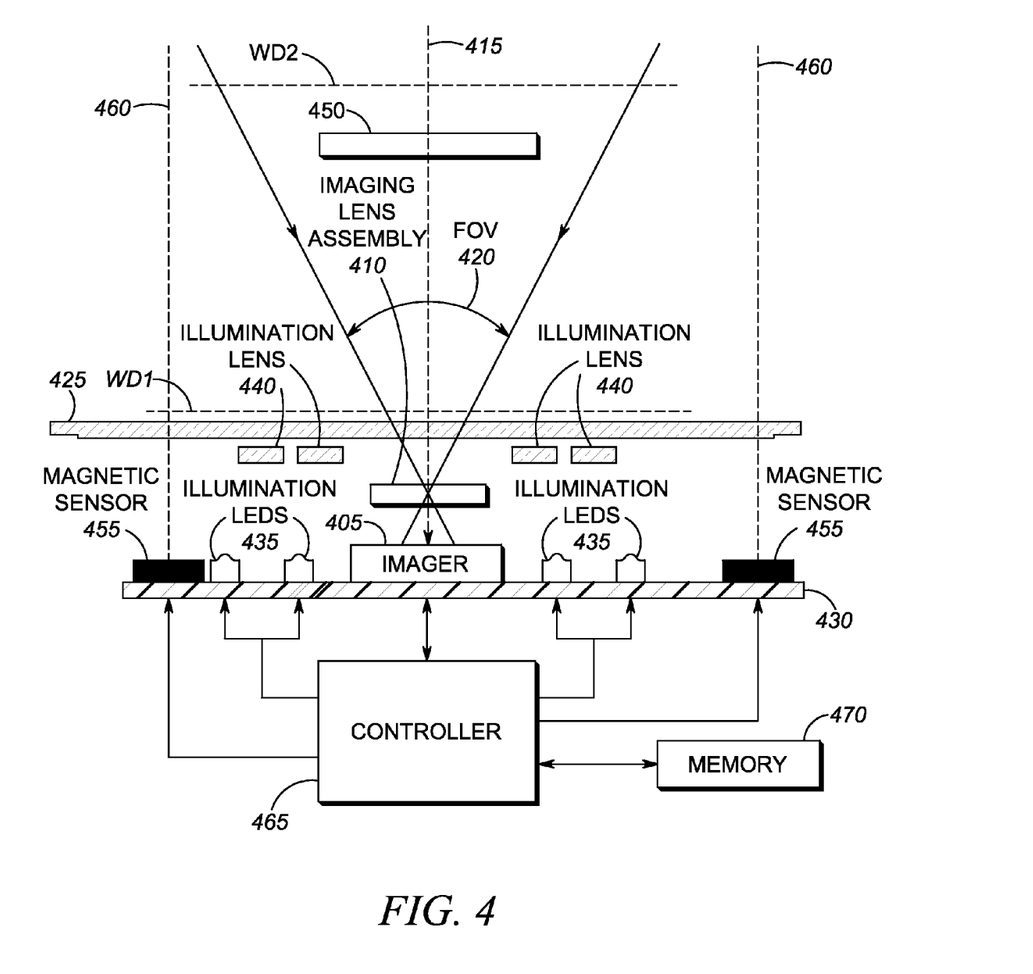
FIG. 4 illustrates a part-schematic, part-diagrammatic view of various components of the electro-optical code reading terminal implementing the method of FIG. 3 in accordance with various embodiments of the present disclosure.

FIG. 1 illustrates an object 100 comprising a printed code 150 to be imaged by an electro-optical code reading terminal of FIG. 4. The printed code 150 is typically printed with ink on media such as paper, foil, plastic, metal, or film labels directly applied to the object 100, or applied on packaging of products, or on membership cards or loyalty cards carried by customers.

Figure 2:
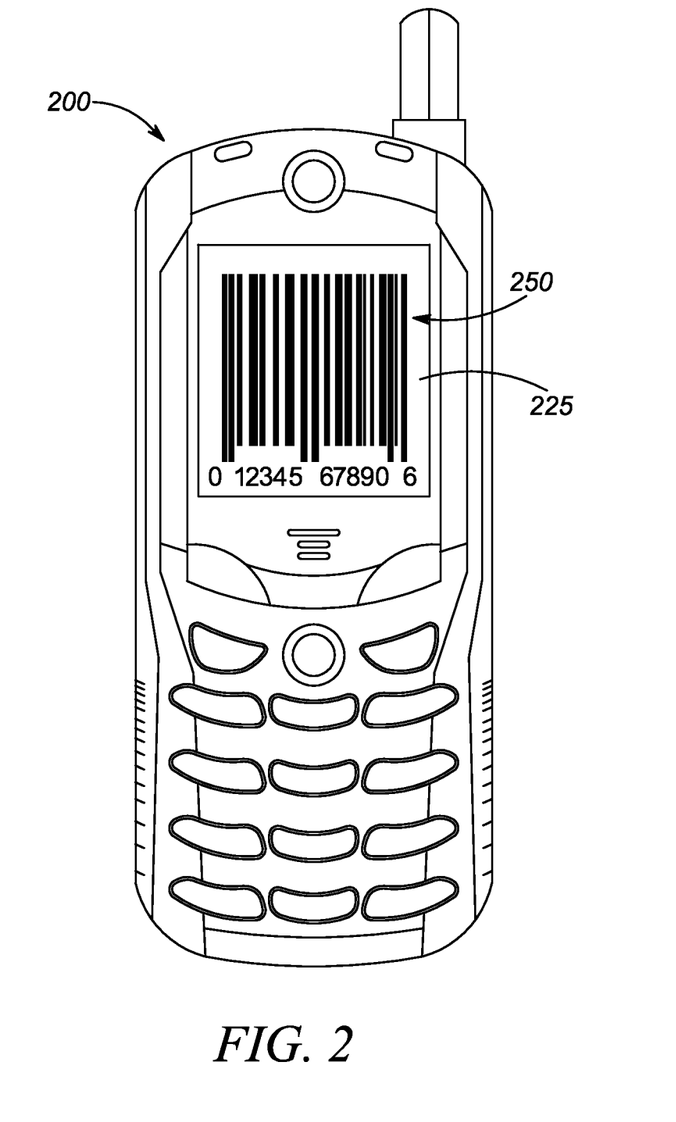
FIG. 2 illustrates a front view of a mobile electronic device comprising the electronically displayed code to be imaged by the electro-optical code reading terminal of FIG. 4.

FIG. 2 illustrates a front view of a mobile electronic device 200 having a display screen 225 on which an electronically displayed code 250 is displayed. The mobile electronic device 200 is any electronic device capable of displaying electronic codes, such as cellular mobiles phones, personal digital assistants (PDAs), e-readers, portable tablets, slates, and computers.

An electronic device, such as mobile electronic device 200 of FIG. 2, operates due to a flow of electric current. By virtue of the flow of electric current, the electronic device generates and emanates a magnetic field in a space surrounding the electronic device. As used herein, the term "magnetic field" is used in a general sense of understanding to a person of ordinary skill in the art and refers to the terms magnetic field B, magnetic field intensity H, or magnetic flux density, used interchangeably in art. The magnitude of the magnetic field in the space surrounding the electronic device is maximal at the surface of the electronic device and decreases as a function of distance from the electronic device. Further, the magnitude of the magnetic field in the space surrounding the electronic device is in the order of a few micro Tesla ($\mu$T); which is also the order of the magnetic field of Earth (at 0° latitude the magnetic field of Earth is 31 $\mu$T; at 50° latitude the magnetic field of Earth is 58 $\mu$T). Further, the frequency of oscillation of the magnetic field surrounding the space of the electronic device is a few Hertz, namely 0-10 Hertz.

Table I, as shown below, depicts a measure of the magnetic field of a commercially available electronic device as measured at varying distances from the commercially available electronic device. During measurement, the commercially available electronic device and a magnetometer are held parallel to the surface of earth and hence, the measured values in the second column of Table I include a net value of the magnetic field due to magnetic fields of the commercially available electronic device and the earth. Table I also lists the value of the magnetic field of the commercially available electronic device after offsetting the value of the magnetic field of the earth, which at the venue of measurement is noted as 39 $\mu$T. It will be understood that although Table I illustrates the magnetic field of the commercially available electronic device having an additive effect to the magnetic field of the earth, magnetic field of another commercially available electronic device may have a subtractive effect to the magnetic field of the earth owing to vector nature of magnetic fields. Also, it is understood that in the current measurement, magnetic field of the earth is accounted for due to an orientation and an axis of measurement of a magnetometer measuring the magnetic field. In a different orientation and/or axis, the magnetometer may measure a null value of magnetic field of the earth owing to vector nature of magnetic fields.

TABLE I

| Distance between a commercially available electronic device and a measuring device (in cm) | Reading (in micro Tesla) | Variation (in micro Tesla) after offsetting Earth's magnetic field |
| --- | --- | --- |
| 12 | 41 | +2 |
| 11 | 43 | +4 |
| 10 | 45 | +6 |
| 09 | 47 | +8 |
| 08 | 53 | +14 |
| 07 | 59 | +20 |
| 06 | 69 | +30 |
| 05 | 86 | +47 |
| 04 | 102 | +63 |
| 03 | 120 | +81 |

The above observation that electronic devices are sources of magnetic field implies that display of electronically displayed codes is accompanied with an emanation of a magnetic field. In contrast, display of the printed code is not accompanied with the emanation of a magnetic field. This difference in the absence and presence of magnetic fields during display of printed codes and electronically displayed codes respectively can be used to detect presence of a proximate electronic device and thus, presence of a proximate electronically displayed code. In accordance with the various embodiments of the present disclosure, this difference is used by an electro-optical code reading terminal to determine presence of an electronically displayed code, such as electronically displayed code 250, on an object present in a field of view of the electro-optical code reading terminal for imaging and decoding. The determination of presence of the electronically displayed code is then used to trigger switching mode of operation of the electro-optical code reading terminal from a printed code reading mode of operation to an electronically displayed code reading mode of operation. Typically, in the printed code reading mode of operation, a code on the object is imaged by exposing an imager of the electro-optical code reading terminal for a first exposure time and an energizing an illumination system of the electro-optical code reading terminal during the first exposure time. In contrast, in the electronically displayed code reading mode of operation, the code on the object is imaged by exposing the imager at least for a second exposure time that is longer than the first exposure time and de-energizing the illumination system during the second exposure time.

Figure 3:
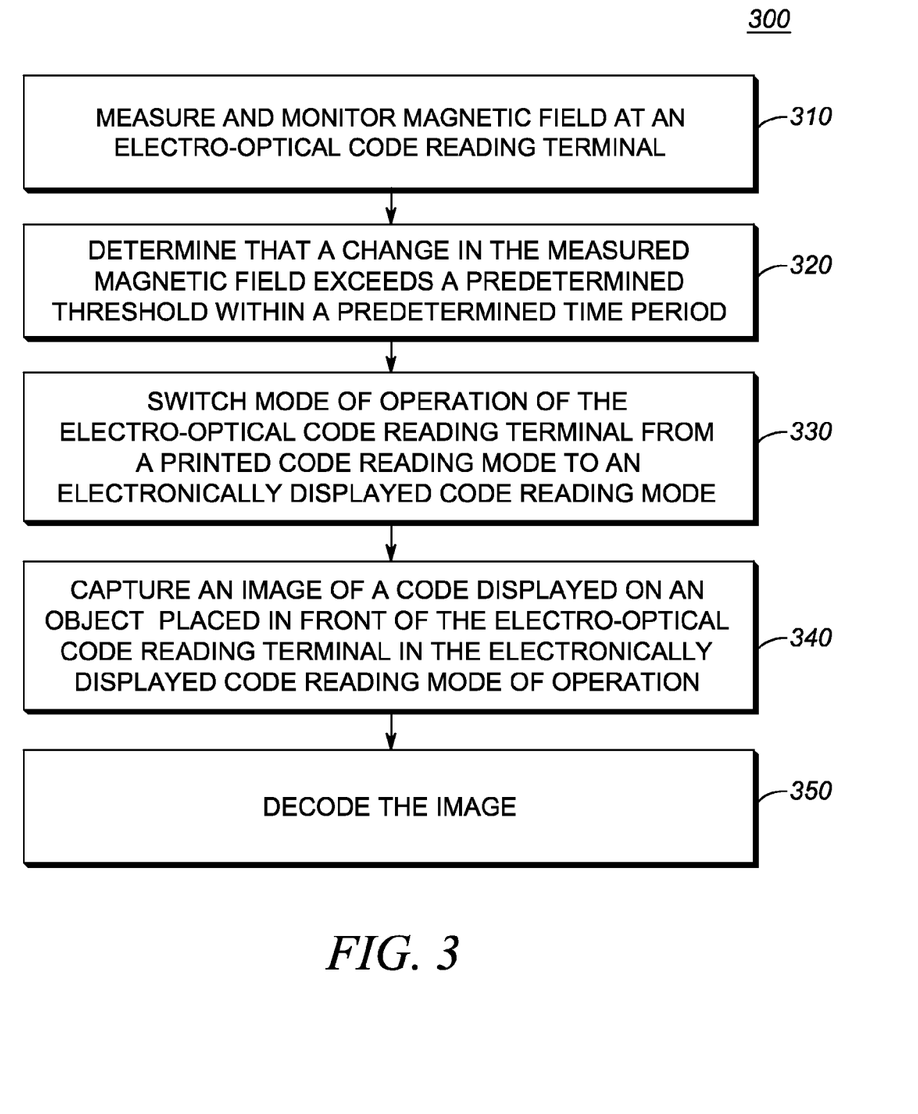
FIG. 3 illustrates a method for operating the electro-optical code reading terminal in accordance with various embodiments of the present disclosure.

FIG. 3 illustrates a method 300 of operating the electro-optical code reading terminal in accordance with various embodiments of the present disclosure. Under normal operation, the electro-optical code reading terminal operates in a printed code reading mode that is optimized for reading printed codes, such as printed code 150 of FIG. 1. At 310, magnetic field experienced at the electro-optical code reading terminal is measured and monitored. The measurement is carried out using one or more magnetic sensors at the electro-optical code reading terminal. Under normal operation, the measured values are static or quasi-static in time and account for one or more of local magnetic fields and the earth's magnetic field that are emanated from sources external to the electro-optical code reading terminal. At 320, it is determined that a change in the measured magnetic field exceeds a predetermined threshold within a predetermined time period. As used herein, it is determined than an increase or decrease in the measured magnetic field exceeds the predetermined threshold in a short time period, such as 0.1-2 seconds. The determination that the change in the measured magnetic field exceeds the predetermined threshold within the predetermined time period is inferred by the electro-optical code reading terminal as presence of an electronically displayed code, such as electronically displayed code 250. In some embodiments, the determination of the change in the measured magnetic field exceeding the predetermined threshold within the predetermined time period is accompanied by a detection of presence of an object in front of the electro-optical code reading terminal to verify that the change in the measured magnetic field is caused by the object in front of the electro-optical code reading terminal. At 330, responsive to the determination at 320 that the change in the measured magnetic field exceeds the predetermined threshold within the predetermined time period, the mode of operation of the electro-optical code reading terminal is switched from the printed code reading mode of operation to the electronically code reading mode of operation for image capture. At 340, an image of the electronically displayed code is captured during the electronically displayed code reading mode of operation. At 350, the captured image comprising the electronically displayed code is decoded using known image processing techniques. In some embodiments, subsequent to a successful decode, the mode of operation of the electro-optical code reading terminal is automatically switched back to the printed code reading mode of operation and the measurement of the magnetic field is stopped for a small duration lasting a few seconds. The measurement of the magnetic field is stopped to negate detection of a change in the measured magnetic field when the electronic device is moved away from the electro-optical code reading terminal subsequent to a successful decode. After the elapse of the small duration, measurement of magnetic field is re-enabled.

FIG. 4 is a part-schematic, part-diagrammatic view illustrating various components of the electro-optical code reading terminal implementing the method 300 of FIG. 3 in accordance with various embodiments. The electro-optical code reading terminal of FIG. 4 comprises an image sensor or imager 405 having an adjustable frame rate and mounted on a printed circuit board (PCB) 430, and an imaging lens assembly 410 mounted in front of the imager 405. The imager 405 is a solid-state device, for example, a charge-coupled device (CCD) or a complementary metal-oxide-semiconductor (CMOS) imager and has a linear or area array of addressable image sensors or pixels, preferably of submegapixel or supermegapixel size, having a reading field of view 420 that diverges away from the window 425 in both horizontal and vertical directions. The imaging lens assembly 410 has an optical axis 415 generally perpendicular to the imager 405 and is operative for capturing light through the window 425 from a target object 450 comprising a code, such as the printed code 150 of FIG. 1 or the electronically displayed code 250 of FIG. 2, located in a range of working distances along the optical axis 415 between a close-in working distance (WD1) and a far-out working distance (WD2), and for projecting the captured light onto the imager 405. In a preferred embodiment, WD1 is about two inches from the imager 405 and generally coincides with the window 425, and WD2 is about eight inches or more from the window 425.

The electro-optical code reading terminal of FIG. 4 further comprises an illumination light system that includes a plurality of illumination light sources, e.g., two pairs of light emitting diodes (LEDs) 435, mounted on the PCB 430 and arranged at opposite sides of the imager 405. Two pairs of illumination lenses 440 are mounted in front of the illumination LEDs 435 to uniformly illuminate the target object 450 with illumination light.

The electro-optical code reading terminal of FIG. 4 further comprises one or more magnetic sensors 455 connected to the PCB 430. In some embodiments, the magnetic sensor(s) 455 are mounted on the PCB 430. In some other embodiments, the magnetic sensor(s) 455 are connected to the PCB 430 but are mounted on a plane that is different from that of the PCB 430, such as the plane comprising the window 425. The magnetic sensor(s) 455 are operative to measure a magnetic field experienced at the electro-optical code reading terminal and output an electrical voltage (or current or resistance) as a function of the measured magnetic field. In some embodiments, the magnetic sensor(s) 455 measure the magnetic field along a single axis 460 that is parallel to the optical axis 415 of the imager 405. Further, in some embodiments, the magnetic sensor(s) 455 measure the magnetic field only along axis 460 to avoid false detections. Moreover, in some embodiments, the magnetic sensor(s) 455 operate in a range of 0-200 µT and have sensitivity of the order of $10^{-1}$ µT or $10^{0}$ µT. As used herein, the term "sensitivity" of a measuring device refers to the smallest magnitude of an input for which the measuring device generates a corresponding output. Moreover, in some embodiments, the magnetic sensor(s) 455 operate to detect magnetic fields that oscillate in the range of 0-10 Hertz, thereby eliminating measurement of local magnetic fields that arise due to high frequency (greater than 40 Hz) current carrying devices present in the vicinity of the electro-optical code reading terminal. One such type of magnetic sensors is anisotropic magneto-resistive (AMR) sensors.

Since magnetic field is a vector quantity, a magnetic field emanating from an electronic device may orient itself in a plurality of directions. A measuring device detects the maximum magnitude of magnetic field (and the maximum change in the magnetic field) when the measuring device is aligned with the direction of the magnetic field to be measured. Accordingly, in accordance with some embodiments of the present disclosure, the magnetic sensor(s) 455 include two pairs of magnetic sensors (See FIG. 5) comprising magnetic sensors 455-1, 455-2, 455-3, and 455-4. Each of the magnetic sensors 455-1, 455-2, 455-3, and 455-4 include an indicator 456-1, 456-2, 456-3, and 456-4 respectively, such as a notch, marking, or an engraving, indicating the magnetic north of the of each of the magnetic sensors 455-1, 455-2, 455-3, and 455-4 respectively. To align along a first direction of magnetic field emanating from an electronic device, magnetic sensors 455-1 and 455-3 are arranged in an anti-parallel direction. That is, the magnetic sensors 455-1 and 455-3 are arranged in parallel with the magnetic norths 456-1 and 456-3 pointing in opposite directions. Such an arrangement allows measurement of the maximum magnitude of the magnetic field (and the change in the measured magnetic field) when the magnetic field of the electronic device orients itself along the first direction. Similarly, to align along a second direction, perpendicular to the first direction, of magnetic field emanating from another electronic device, magnetic sensors 455-2 and 455-4 are arranged in an anti-parallel direction and perpendicular to the pair of magnetic sensors 455-1 and 455-3. Such an arrangement of magnetic sensors 455-2 and 455-4 allows measurement of the maximum magnitude of the magnetic field (and the change in measured magnetic field) when the magnetic field of the another electronic device orients itself along the second direction.

Further, in accordance with some embodiments of the present disclosure, the electro-optical code reading terminal additionally comprises an object sensor 475 (See FIG. 5) for object proximity detection. In some embodiments, the object sensor 475 includes an infrared (IR) sensor operative for directing IR light through the window 425 and for detecting presence of the target object 450 in an object field of view of the object sensor 475.

Further, for improved performance, the electro-optical code reading terminal optionally comprises a distance determination unit (not shown) operative for determining a distance between the target object 450 and the electro-optical code reading terminal. By way of a non-limiting example, the distance determination unit comprises an ultrasonic range detector, a stereo camera, a laser aimer combined with a CMOS sensor or any other sensor or device(s) that outputs an electrical voltage as a function of measured distance using conventional distance measurements techniques, such as Time of Flight (ToF) measurements or 3Dimensional (3D) image generation.

Returning to FIG. 4, the electro-optical code reading terminal of FIG. 4 comprises a controller 465 that is operatively connected to the imager 405, the illumination LEDs 435, the magnetic sensor(s) 455, and if present, to the object sensor 475 and the range detector unit, for controlling the operation of all these electrical components. The controller 465 includes one or more microprocessors, microcontrollers, DSPs (digital signal processors), state machines, logic circuitry, or any other device or devices that process information based on operational or programming instructions stored in a memory 470 of the electro-optical code reading terminal. The memory 470 an integrated-circuit (IC) memory chip containing any form of random-access memory (RAM), a floppy disk, a compact disk with read write (CD-RW), a hard disk drive, a digital versatile disc with read write (DVD-RW), a flash memory card, external subscriber identity module (SIM) card or any other medium for storing digital information.

Figure 6:
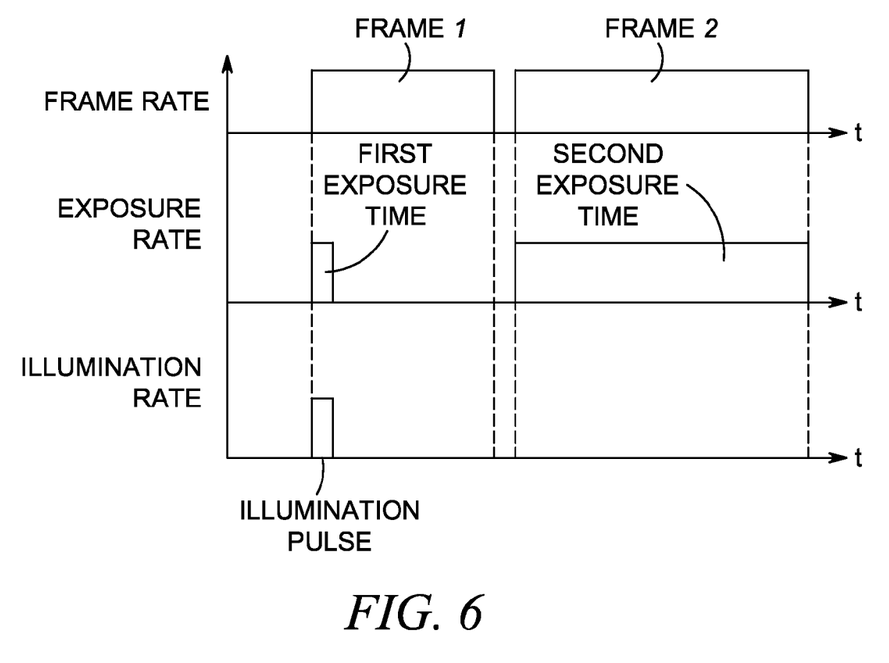
FIG. 6 illustrates a graph depicting comparison between a printed code reading mode of operation and an electronic code reading mode of operation of the electro-optical code reading terminal in accordance with the various embodiments of the present disclosure.

In accordance with the various embodiments of the present disclosure, the controller 465 is operative to process light scattered from the target object 450 comprising the code and to decode an image of the code of target object 450 as captured by the imager 405. Further, the controller 465 is operative to operate the electro-optical code reading terminal in a printed code reading mode of operation and an electronically displayed code reading mode of operation. During the printed code reading mode of operation, the controller 465 exposes the imager 405 (nominally operated at a frame rate of about 60 frames per second) for a first exposure time (see FIG. 6), and also energizes the illumination LEDs 435 during the first exposure time. By way of non-limiting example, the first exposure time can be less than 1 millisecond, and preferably less than 0.5 milliseconds. During the electronically displayed code reading mode of operation, the controller 465 decreases the frame rate of the imager 405, exposes the imager 405 at least for a second exposure time (see FIG. 6) and also de-energizes the illumination LEDs 435 during the second exposure time. The second exposure time is made longer in duration than the first exposure time to compensate for the absence of the illumination light. By way of non-limiting example, the second exposure time can be greater than 10 milliseconds, and preferably greater than 30 milliseconds, and even greater than 40 milliseconds. The second exposure time is longer in duration than the first exposure time since extra time is needed in order to successfully read the electronically displayed code without having to deal with reflections of the illumination light off the glass pane of electronic devices.

Figure 5:
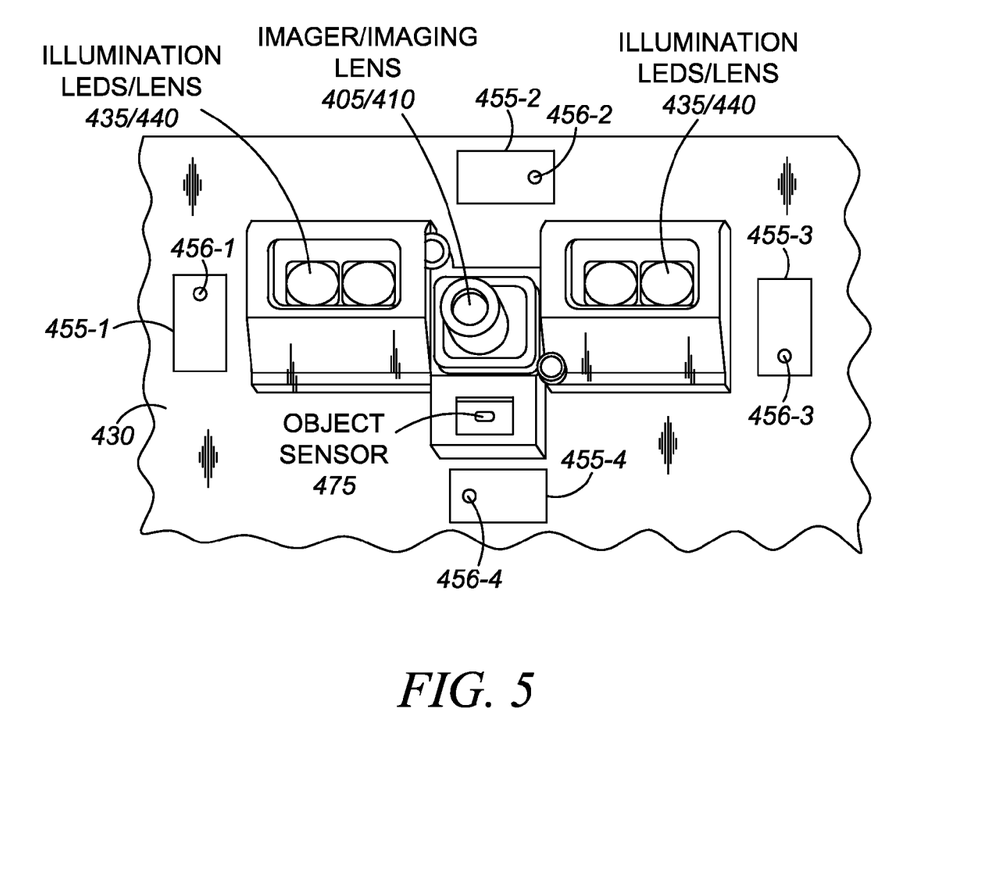
FIG. 5 illustrates a broken-away, enlarged, perspective view of the electro-optical code reading terminal depicting some of the components of FIG. 4 in accordance with the various embodiments of the present disclosure.

In accordance with the various embodiments of the present disclosure, the controller 465 is further operative to dynamically switch the mode of operation of the electro-optical code reading terminal from the printed code reading mode of operation to the electronically displayed code reading mode of operation when the controller 465 determines that a change in the measured magnetic field, as measured by the magnetic sensor(s) 455 (or as measured by at least one magnetic sensor of the two pairs of the magnetic sensors comprising magnetic sensors 455-1, 455-2, 455-3, and 455-4), exceeds a predetermined threshold within a predetermined time period. In some embodiments, the controller 465 samples measured magnetic field values from the magnetic sensor(s) 455 (or from magnetic sensors 455-1, 455-2, 455-3, and 455-4) at regular periods. The controller 465 then calculates a difference between measured magnetic field values received for two samples, such as measured magnetic field sample S1 received at time t1 and measured magnetic field sample S2 received at time t2. Herein, S1 and S2 can be two consecutive samples. The controller 465 determines whether the difference between measured magnetic field values (S1-S2 or S2-S1) exceeds a predetermined threshold. Further, the controller 465 also determines whether t2-t1 is less that the predetermined time period T. When the difference between measured magnetic field values exceeds a predetermined threshold, and when the t2-t1 is less than T, the controller 465 switches the mode of operation of the electro-optical code reading terminal from the printed code reading mode of operation to the electronically displayed code reading mode of operation.

In some embodiments where the electro-optical code reading terminal comprises the object sensor 475, controller 465 determines that the change in measured magnetic field exceeds the predetermined threshold within the predetermined time period when the object sensor 475 detects the presence of target object 450 in the object field of view 420 of the object sensor 475. Moreover, in some embodiments where the electro-optical code reading terminal comprises the range detector unit for measuring the distance between the target object 450 and the electro-optical code reading terminal, the controller 465 switches mode of operation of the electro-optical code reading terminal responsive to determining that the change in the measured magnetic field exceeds the predetermined threshold within the predetermined time period and when the change in the measured magnetic field corresponds to an expected range of change in magnetic field values at the measured distance. In this embodiment, the memory 470 stores the expected range of change in magnetic field values corresponding to a range of distances from the electro-optical code reading terminal. For example, in accordance with Table I, the memory may store an expected change of 30-90 µT corresponding to a range of distances from 0-5 centimeters; and an expected change of 5-30 µT corresponding to a range of distances from 6-10 centimeters.

In accordance with some embodiments of the present disclosure, the electro-optical code reading terminal of FIG. 4 additionally comprises an alert indication unit (not shown) comprising one or more LEDs and a speaker. The alert indication unit is operative to present an alert to an operator of the electro-optical code reading terminal when the controller 465 switches mode of operation of the electro-optical code reading terminal. In one instance, the alert is presented to the operator in the form an audio beep. In another instance, the alert is presented to the operator in the form of a blinking LED from a plurality of LEDs present on the electro-optical code reading terminal.

The present disclosure utilizes detection of instantaneous changes in magnetic fields to detect presence of electronic devices and hence, detection of electronically displayed codes. This allows the electro-optical code reading terminal to automatically select its mode of operation prior to image capture, thereby reducing the number of hit-and-trials for imaging the electronically displayed code. Further, the use of magnetic sensors provides a cost effective and computationally convenient way of differentiating between electronically displayed codes and printed codes.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An electro-optical code reading terminal comprising:
   an energizable illumination system operative for illuminating objects positioned in a field of view of the electro-optical code reading terminal with illumination light;
   a solid-state, exposable imager having an array of light sensors and operative for capturing return illumination light from objects positioned in the field of view of the electro-optical code reading terminal;
   at least one magnetic sensor operative for measuring magnetic field experienced by the electro-optical code reading terminal;
   a controller operative for dynamically switching mode of operation of the electro-optical code reading terminal from a printed code reading mode of operation to an electronically displayed code reading mode of operation responsive to determining that a change in the measured magnetic field exceeds a predetermined threshold within a predetermined time period.

2. The electro-optical code reading terminal of claim 1, wherein during the printed code reading mode of operation, the controller is operative for exposing the imager for a first exposure time and energizing the illumination system during the first exposure time for image capture.

3. The electro-optical code reading terminal of claim 2, wherein during the electronically displayed code reading mode of operation, the controller is operative for the imager at least for a second exposure time and de-energizes the illumination system during the second exposure time for image capture, wherein the second exposure time is greater than the first exposure time.

4. The electro-optical code reading terminal claim 2, wherein the controller is operative for operating the imager at an adjustable frame rate of multiple frames per second, and wherein the first exposure time lasts for a fraction of one frame.

5. The electro-optical code reading terminal of claim 1, wherein the at least one magnetic sensor is operative for measuring magnetic fields emanating from sources external to the electro-optical code reading terminal.

6. The electro-optical code reading terminal of claim 1, further comprising an object sensor operative for detecting presence of the object in an object field of view of the object sensor.

7. The electro-optical code reading terminal of claim 6, wherein the controller is further operative for dynamically switching the printed code reading mode of operation to the electronically displayed code reading mode of operation responsive to determining that the change in the measured magnetic field exceeds the predetermined threshold within the predetermined time period and when the object sensor detects presence of the object in the object field of view of the object sensor.

8. The electro-optical code reading terminal of claim 1, wherein further comprising a distance determination unit operative for determining a distance between the electro-optical code reading terminal and the object, and wherein the processor is further operative for dynamically switching from the printed code reading mode of operation to the electronically displayed code reading mode of operation responsive to determining that the change in the measured magnetic field exceeds the predetermined threshold within the predetermined time period and when the determined distance corresponds to a range of associated change in the measured magnetic field.

9. The electro-optical code reading terminal of claim 1, wherein the at least one magnetic sensor is an anisotropic magneto-resistive sensor.

10. The electro-optical code reading terminal of claim 1, wherein sensitivity of the at least one magnetic sensor is of the order of one of 0.1 μT and 1 μT.

11. The electro-optical code reading terminal of claim 1, wherein the at least one magnetic sensor is operative for measuring magnetic fields along an axis that is parallel to an optical axis of the imager.

12. The electro-optical code reading terminal of claim 1, wherein the at least one magnetic sensor comprises two pairs of magnetic sensors, wherein the magnetic sensors within each pair are positioned in an anti-parallel direction, and wherein both the pairs are positioned perpendicular to each other, and wherein the controller is operative for detecting the change in the magnetic field from at least one magnetic sensor of the two pairs magnetic sensors.

13. The electro-optical code reading terminal of claim 1, wherein the predetermined time period is shorter than 2 seconds.

14. The electro-optical code reading terminal of claim 1, further comprising an alert indication unit operative for presenting an alert responsive to the controller dynamically switching mode of operation of the electro-optical code reading terminal from the printed code reading mode of operation to the electronically displayed code reading mode of operation.

15. The electro-optical code reading terminal of claim 1, wherein the electro-optical code reading terminal is one of a flat-bed imaging terminal, a bi-optic point-of-sale imaging terminal and a handheld barcode imaging terminal.

16. A method for dynamically switching from a printed code reading mode of operation to an electronically displayed code reading mode of operation, the method comprising:
at an electro-optical code reading terminal:
    measuring, using at least one magnetic sensor, magnetic field experienced by the electro-optical code reading terminal;
    determining that a change in the measured magnetic field exceeds the predetermined threshold within a predetermined time period;
    dynamically switching mode of operation of the electro-optical code reading terminal from the printed code reading mode of operation to the electronically displayed code reading mode of operation responsive to determining that the change in the measured magnetic field exceeds the predetermined threshold within the predetermined time period; and
    capturing an image of a code on an object placed a field of view of the electro-optical code reading terminal during the electronically displayed code reading mode of operation.

17. The method of claim 16, further comprising:
    exposing an imager of the electro-optical code reading terminal for a first exposure time and energizing an illumination system of the electro-optical code reading terminal during the first exposure time during the printed code reading mode of operation; and
    exposing the imager at least for a second exposure time and de-energizing the illumination system during a second exposure time during the electronically displayed code reading mode of operation, wherein the second exposure time is greater than the first exposure time.

18. The method of claim 16, further comprising:
    determining, using an object sensor, presence of the object in an object field of view of the object sensor; and
    dynamically switching from the printed code reading mode of operation to the electronically displayed code reading mode of operation responsive to determining that the change in the measured magnetic field exceeds the predetermined threshold within the predetermined time period and determining presence of the object in an object field of view of the object sensor.

19. The method of claim 16, further comprising:
    determining a distance between the electro-optical code reading terminal and the object; and
    dynamically switching from the printed code reading mode of operation to the electronically displayed code reading mode of operation responsive to determining that the change in the measured magnetic field exceeds the predetermined threshold within the predetermined time period and when the determined distance corresponds to a range of associated change in the measured magnetic field.

20. The method of claim 16, further comprising:
    automatically switching mode of operation of the electro-optical code reading terminal from the electronically displayed code reading mode of operation to the printed code reading mode of operation after successful decoding of the captured image;
    stopping measurement of magnetic field by the at least one magnetic sensor for a predefined duration after successful decoding of the captured image; and
    re-enabling measurement of magnetic field by the at least one magnetic sensor after elapse of the predefined duration.

* * * * *